Jan. 6, 1959  A. CHAMPAGNAT  2,867,347
LIQUID STORAGE APPARATUS
Filed Jan. 28, 1957  3 Sheets-Sheet 1

INVENTOR
ALFRED CHAMPAGNAT
BY
*Morgan, Finnegan, Durham & Pine*
ATTORNEYS

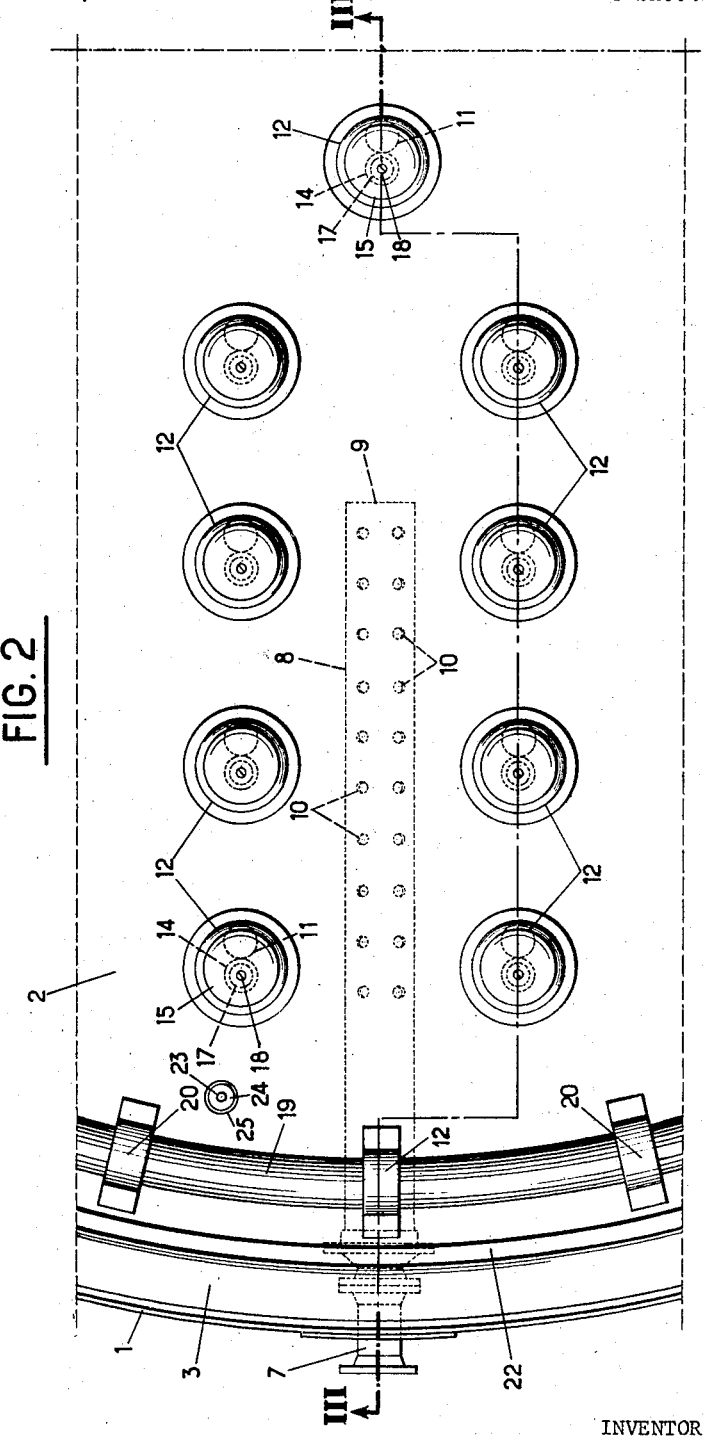

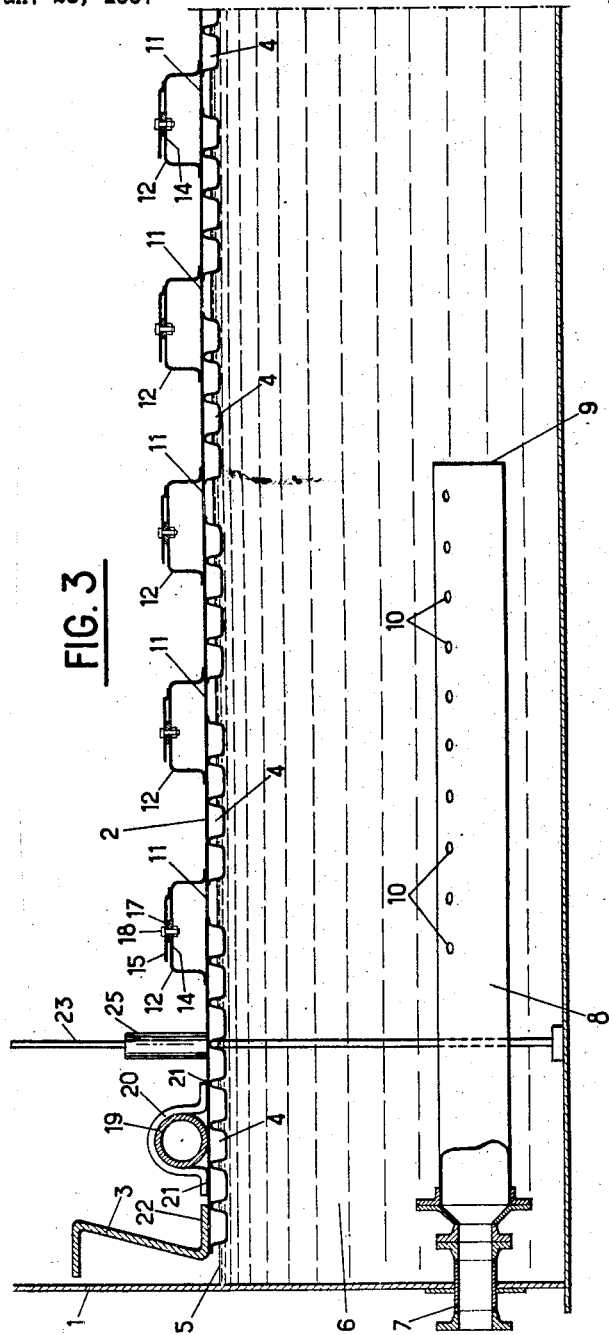

United States Patent Office 2,867,347
Patented Jan. 6, 1959

2,867,347

LIQUID STORAGE APPARATUS

Alfred Champagnat, Paris, France, assignor of one-half to The British Petroleum Company Limited, London, England, a British corporation Application January 28, 1957, Serial No. 636,808

Claims priority, application France February 4, 1956

7 Claims. (Cl. 220—26)

This invention relates to devices for the storage of liquids and more particularly to apparatus for protecting liquids which are stored in vertical storage tanks. This invention is especially useful for reducing the evaporation of such liquids as petroleum distillate, crude petroleum, and other volatile and non-volatile liquids, for reducing the risk of fire and explosion of these types of liquids and generally for protecting any liquid which is affected by the presence of air.

Various devices have been proposed for protecting stored liquids. One of these devices is a flexible screen which is adapted to float on the surface of liquid stored in a vertical tank of the fixed-roof type. Among the more successful flexible screens is a screen made of plastic material whose area is slightly less than the area of the cross section of the tank and whose circumference is bordered by a vertical apron which provides a gaseous seal at the surface of the liquid along the side wall of the tank. A flexible screen of this type is described in detail and claimed in the co-pending United States application, Serial No. 536,550, filed September 26, 1955.

While this type of screen worked extremely well, it created a demand for an even better screen which would solve a problem which existed in connection with the storage of some fluids; that is, the rapid accumulation of air or other gases under the floating screen. These air or gas pockets tended to deform, bend or move the screen leaving an uncovered area near the edge of the screen. The uncovered area in turn permitted gas bubbles to escape through the surface of the liquid onto the top of the screen and in some cases actually fold over the edge of the screen.

Therefore, an object of this invention is to provide improved means for protecting a stored liquid.

A more specific object of this invention is to provide improved apparatus for use with vertical storage tanks of the fixed-roof type which minimizes evaporation of the stored liquid and reduces the risk of fire and explosion notwithstanding the fact that the liquid is initially injected into the tank together with air or any other gas.

Another object of the invention is to provide a light flexible screen to cover the surface of a stored fluid which is not deformed by pockets of gas in the fluid.

Other objects of the invention will be obvious or may be learned by practice with the invention, the same being realized and attained by means of the combinations, improvements and instrumentalities pointed out in the appended claims.

The invention consists of the novel parts, constructions, arrangements, combinations and improvements herein shown and described.

Briefly, in accordance with the invention, apparatus is provided for protecting fluid in a tank having a side wall with a filling pipe extending through the side walls, the apparatus comprising a flexible screen adapted to float on and protect the surface of the fluid, an extension tube adapted to be connected to the filling pipe to project into the tank, the portion of the screen over the extension tube having valve-covered openings whereby when fluid and a gas are pumped into the tank, the gas rises to the surface of the fluid in the vicinity of and passes through the valve-covered openings in the screen.

A feature of the invention is a reinforcing element preferably consisting of a semi-rigid rod or hollow tube of plastic or aluminium which is connected to the top of the screen and is disposed along the periphery of the screen. The purpose of this feature is to reduce bending of the screen and to oppose the tendency of the screen to move away from the side wall.

Another feature of the invention is a plurality of holes disposed along the top of the extension tube with the hole nearest the side wall being a predetermined distance (at least fifty centimeters) from the side wall. The purpose of this feature is to inject the fluid and gaseous mixture into the tank in a number of streams which are spaced a distance from the side wall.

A further feature of the invention is a novel valve construction for covering each of the openings in the screen comprising a plastic material in the form of an inverted flattened cup or bell attached over each opening in the screen. An aperture is provided in the flattened portion which is displaced from the vertical extension of the opening. A flexible weighted plastic flap is attached near one side of and extends over the aperture.

Briefly, the apparatus operates in the following manner in accordance with the invention: The gas-containing liquid is pumped into the tank through the extension tube which is sufficiently long so that the injected gases are away from the side wall of the tank. The gaseous liquid is divided into a number of independent jets by the holes along the length and through the top of the extension tube. The gases issuing from the holes rise directly to the surface and pass through the valve-covered openings in the screen. The reinforcing element which borders the periphery of the screen prevents deforming of the edge of the screen and the valve-covered openings in the screen prevent the formation of gas pockets beneath the screen.

The invention in its broader aspects is not limited to the specific combinations, improvements and instrumentalities described, but departures may be made therefrom within the scope of the accompanying claims without departing from the principles of the invention and without sacrificing its chief advantages.

In order to illustrate the possibilities of carrying out the invention without thereby in any way restricting the scope of the invention, the preferred embodiment of the invention will be shown by way of example only in connection with a flexible screen of the type disclosed and claimed in the above-cited United States patent application. However, it should be noted that the invention is equally applicable to any type of flexible screen.

Other objects, features and advantages of the invention will be apparent from the following detailed description which serves to explain the principles of the invention when read together with the accompanying drawings which constitutes a part hereof, wherein:

Fig. 2 is an enlarged view of a portion of the apparatus shown in Fig. 1 showing the valve-covered openings, the extension tube and the reinforcing element in greater detail.

Fig. 3 is a cross section of the vertical tank and liquid protecting apparatus taken along the lines III—III of Figs. 1 and 2.

Before describing the apparatus in detail, it is deemed advisable to describe briefly how air or gas is introduced into a storage tank, especially in the case of petroleum hydrocarbons. In this case air or hydrocarbon gases are pumped into the tank at the same time as the liquid. Such an introduction of air or hydrocarbon gases generally occurs in the following cases:

(1) At the beginning of the pumping of a liquid into the storage tank, the piping system is partially or completely filled with air and this air is pushed by the pumped liquid into the tank.

(2) When a tank is filled from a tanker, towards the end of the pumping the pump sucks air from the emptied compartments of the tanker which is pumped into the storage tank.

(3) In the case where a liquified gas such as butane is to be mixed with a stored liquid such as gasoline, there is usually insufficient pressure in the filling pipe at the bottom of the tank to prevent part of the liquified gas from reverting to the gaseous state.

The rising of pockets of gas through the liquid would normally tend to cause eddy currents and to create pockets of gas beneath the surface of the flexible screen to raise and deform the screen and thereby permit other gas bubbles to bend the edges of the screen and in some cases actually cause the edge of the screen to be folded back on itself. This problem is solved by the present invention.

Figure 1:
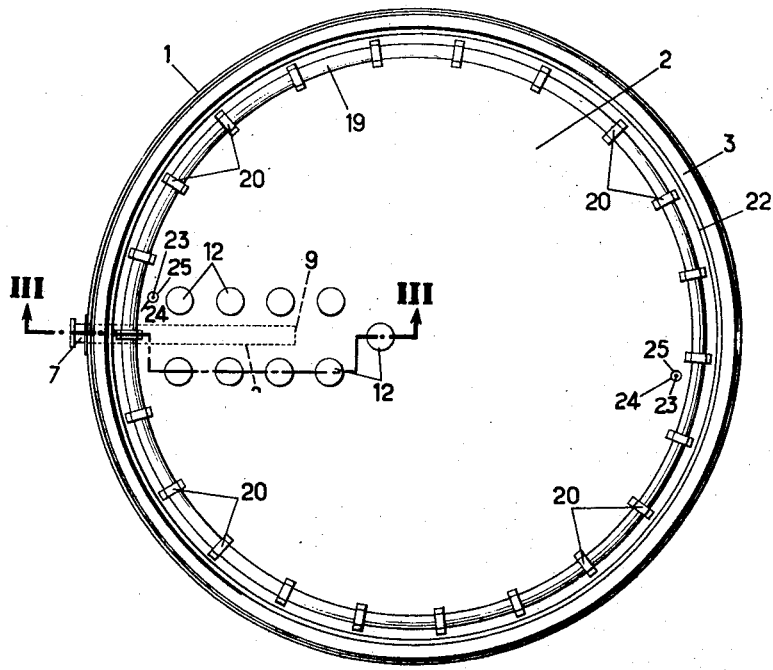
Fig. 1 is a top view of a vertical storage tank (with the fixed-roof removed) illustrating a flexible screen together with the reinforcing element and the valve-covered openings with the extension tube shown in dotted outline, in accordance with the preferred embodiment of the invention.

Referring to Figs. 1 and 3, a vertical tank is shown (with its fixed-roof removed) having a side wall 1 with a floating screen 2 having a Z-shaped apron 3 (Fig. 3) along its circumference, floating by means of the attached floats 4 on the surface 5 of the liquid 6. The usual filling pipe 7 is mounted at the bottom of the tank, and an extension tube 8 is connected to the filling tube 7 and projects toward the center of the tank parallel to the bottom of the tank.

The extension tube 8 has an open end 9 and a plurality of holes 10 which are disposed along the length of the extension tube 8 and pass through the top of the extension tube 8 (that is, the holes 10 pass through the portion of the extension tube 8 nearest the surface 5 of the liquid 6).

Figure 4:
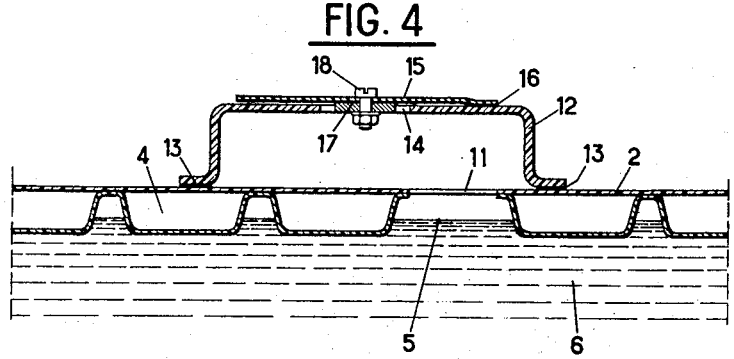
Fig. 4, finally, is an enlarged cross-sectional view of a valve-covered opening in accordance with that feature of the invention.

A plurality of openings 11 are provided in the screen 2 which are disposed over on both sides and along the length of the extension tube 8 as is illustrated in Fig. 2. The screen 2 of the preferred embodiment of the invention shown in the drawings, is, as previously stated herein, of the type disclosed and claimed in my above-cited U. S. application Serial No. 536,550. The screen or blanket therein disclosed is provided with an orifice placed exactly below a vent provided in the roof of the tank to allow gauging and sampling. Moreover, in order to maintain the position of the gauging orifice of the screen below the roof vent, it is necessary to prevent any rotation of the screen. this being achieved, for example, as disclosed in said application, by stretching two vertical cables between the roof and bottom of the tank, these cables passing through the screen by holes therein provided for the purpose. It follows that in thus preventing rotation of the screen for gauging purposes, relative displacement of the openings 11 and the extension tube 8 will also be prevented. In Fig. 1 there are depicted two such cables 23 each passing through a hole 24 in the screen bordered by a collar 25 serving to restrict losses by evaporation. A plurality of valves 12 are provided to cover the openings 11. Each valve 12 is made of a plastic material in the form of a flattened cup or bell with a lip 13 (Fig. 4) connected by welding or other means to the screen 2. Each of the valves 12 contains an aperture 14 in the center of its flattened portion which is displaced from the vertical extension of the opening 11. The area of each aperture 14 is equal to the area of the opening 11. A flap 15 is connected at one edge 16 to the flattened portion of the cup 12. A metal bead or weight 17 is connected by an assembling device 18 (which may be a bolt, nut and washer) to the center of the flap 15. The flap 15 opens when air or any gas is introduced into the tank with the pumped liquid.

The semi-rigid hollow tube 19 (Figs. 1 and 3) borders the periphery 22 of the screen 2 at a distance from the periphery and is attached to the screen 2 by means of the straps 20 which are connected at attaching points 21 (Fig. 3) to the screen 2.

The screen 2 is preferably made of a plastic material such as non-plasticized polyvinyl chloride. The parts of the valve 12, the straps 20 and the floats 4 may be made from the same or similar material. The hollow tube 19 which functions as the reinforcing element may be made of a pliable and plastic material such as polyethylene or be made of aluminium. The hollow tube 19 or an equivalent reinforcing element such as a rod may be attached only to a part of the circumference preferably at the side where a gas is injected. The tube 19 may be made either in a number of independent pieces in order to maintain suppleness of the screen 2 or in the form of a single annular element. The tube 19 is preferably arranged some distance from the circumference 22 of the screen 2, for example, twenty centimeters. The tube 19 may be replaced by a rod or a light and elastic sectional metal. The length of the extension tube 8 is at least fifty centimeters, and is preferably from two to three meters long, with the hole 10 nearest the side wall 1 being not less than fifty centimeters distance from the side wall in the preferred embodiment. Similarly, the valve-covered opening 11 nearest to the side wall 1 is a distance greater than fifty centimeters from the side wall. Each of holes 10 has a diameter of about thirty millimeters. The total area of the openings 11 in the screen 2 is at least equal to the area of the cross section of the extension tube 8, which in turn is at least double the area of the cross section of the filling pipe 7 to facilitate removal of the gas.

The apparatus operates in the following manner (Fig. 3):

The gas-containing liquid is pumped through the filling pipe 7 into the extension tube 8 and enters the tank via the open end 9 and by a plurality of jets through the holes 10. The gas in the liquid rises by a very short path to the surface 5 of the fluid 6 in the vicinity of the openings 11 which are disposed over the extension tube 8. The gas then passes through the openings 11 and the apertures 14 of the valves 12 without the screen 2 being moved, bent or lifted to any appreciable extent. Since each aperture 14 is displaced from the vertical extension of the opening 11, the fluids which are ejected with the gas do not pass through the aperture 14 onto the top of the screen 2. Further, since the gas is pumped toward the center of the tank, it does not rise to the surface near the edge of the screen 2 but passes through the valve-covered openings 11.

The dimensions indicated above, that is, the dimensions of the filling pipe 7, extension tube 8, holes 10, openings 11 and apertures 14, are chosen to facilitate removal of the gases from the fluid. Thus, the overall combination results in apparatus which functions to protect the surface of the stored liquid even though gases are pumped into the liquid.

Therefore, in accordance with the invention, improved apparatus has been provided for protecting liquids from evaporation and from fire and explosion which in part consists of a light flexible screen which is not deformed by pockets of gas in the liquid.

Although the invention has been disclosed in connection with a single embodiment, it will be apparent that many modifications and changes may be readily made without departing from the spirit and scope of the invention.

What is claimed is:

1. Apparatus for storing a volatile fluid comprising a tank having a bottom, a rigid side wall and a top, a filling pipe extending through said side wall, a flexible screen to cover the surface of the stored fluid, a plurality of hollow elements at the bottom of said screen to cause said screen to float on the surface of the stored fluid, an open-ended extension tube connected to said filling pipe and extending from said side wall into said tank and parallel to the bottom of said tank, a plurality of holes spaced along the length and passing through the top of said extension tube, the length of said extension tube being greater than fifty centimeters with the hole nearest to said side wall being at least fifty centimeters from said side wall, a plurality of openings in said screen disposed over said extension tube, the opening nearest said side wall being at least fifty centimeters from said side wall, a plurality of valves attached to the top of said screen each covering one of said openings, the total cross-sectional area of said openings being at least equal to the cross-sectional area of said extension tube, the cross-sectional area of said extension tube being at least double the cross-sectional area of said filling pipe, and a semi-rigid reinforcing element attached to the top of said screen near the periphery of said screen whereby when fluid and a gas are injected into said tank via said filling pipe and said extension tube, deforming of said screen by pockets of gas is minimized by said reinforcing element and by said valve-covered openings which permit escape of the gas which rises to the surface of the fluid.

2. The apparatus of claim 1 wherein each of said valves comprises a plastic material in the form of an inverted flattened cup attached to the top of the screen and covering the associated opening, an aperture in the flattened portion of said cup arranged above said opening but displaced from the vertical extension of said opening, a flexible plastic flap attached near one side of and extending over said aperture to cover said aperture, and a weight attached to said flap in a position over said aperture to keep said aperture substantially closed except when gas is passing through said opening in said screen.

3. The apparatus of claim 1 wherein said semi-rigid reinforcing element is a hollow tube arranged to border substantially the entire periphery of said screen and is made of a material selected from the group consisting of aluminium and plastic.

4. The apparatus of claim 1 wherein said extension tube has a length of two to three meters and the diameter of each of the holes provided in said extension tube is about thirty millimeters.

5. Apparatus for protecting a volatile liquid stored in a tank having a side wall and a filling pipe extending through the side wall, comprising: a flexible screen floating on the surface of the stored liquid; a stationary extension tube located below the surface of the stored liquid and attached to the filling pipe, said extension tube extending generally parallel to the surface of the stored liquid toward the center of the tank and having a number of apertures disposed along its top for dividing a stream of fluid being supplied to said tank through said filling pipe and extension tube into a plurality of independent jets rising directly toward the surface of the stored liquid, said apertures being spaced at a distance from said side wall sufficient to space said jets away from said side wall, said screen having a number of valved gas escape openings and normally closed valve means therefor, located in the area of said screen generally immediately overlying said extension tube, and disposed in said area along the length of said tube; and, a reinforcing element attached to said screen and disposed near its periphery, whereby when a gas-containing liquid is introduced into said tank bending of said screen by pockets of gas is prevented by said reinforcing element and by said openings and valve means which permit gas in the jets issuing from said apertures to rise directly to the surface of said stored liquid and escape through said valved openings.

6. Apparatus in accordance with claim 5 in which the aperture in said extension tube nearest said side wall is at a distance of at least 50 centimeters from said side wall, and in which the area of the cross section of said extension tube is not greater than the total area of the cross sections of the openings in the screen.

7. Apparatus in accordance with claim 6 in which the area of the cross section of the extension tube is at least twice the area of the cross section of the filling pipe.

References Cited in the file of this patent

UNITED STATES PATENTS

| | | |
|---|---|---|
| 1,287,223 | Cathey | Dec. 10, 1918 |
| 1,636,539 | Wiggins | July 19, 1927 |
| 1,913,643 | Smith | June 13, 1933 |
| 2,023,308 | Cantacuzene | Dec. 3, 1935 |
| 2,115,016 | Ehlers | Apr. 26, 1938 |
| 2,281,748 | Carney | May 5, 1942 |
| 2,771,906 | Bratfisch et al. | Nov. 27, 1956 |

FOREIGN PATENTS

| | | |
|---|---|---|
| 588,174 | Germany | Nov. 16, 1933 |